(12) United States Patent
Nakamori

(10) Patent No.: US 8,109,558 B2
(45) Date of Patent: Feb. 7, 2012

(54) DOOR STRUCTURE

(75) Inventor: Yoji Nakamori, Gamagori (JP)

(73) Assignee: Mitsubishi Jidosha Kogyo K.K., Tokyo (JP)

( * ) Notice: Subject to any disclaimer, the term of this patent is extended or adjusted under 35 U.S.C. 154(b) by 263 days.

(21) Appl. No.: 11/316,735

(22) Filed: Dec. 27, 2005

(65) Prior Publication Data

US 2006/0137249 A1    Jun. 29, 2006

(30) Foreign Application Priority Data

Dec. 28, 2004    (JP) ................. P2004-381178

(51) Int. Cl.
 *B60J 5/00*    (2006.01)
(52) U.S. Cl. ................. 296/146.6; 49/502
(58) Field of Classification Search ............ 49/502; 296/146.5, 146.6, 146.7
 See application file for complete search history.

(56) References Cited

U.S. PATENT DOCUMENTS

| | | | |
|---|---|---|---|
| 5,417,470 A * | 5/1995 | Holt | 296/187.12 |
| 6,134,840 A | 10/2000 | Pleiss | |
| 6,205,714 B1 * | 3/2001 | Staser et al. | 49/502 |
| 6,615,475 B2 * | 9/2003 | Berta et al. | 29/469 |
| 7,048,324 B2 * | 5/2006 | Armbruster et al. | 296/146.6 |
| 7,059,657 B2 * | 6/2006 | Bodin et al. | 296/146.6 |
| 2003/0194542 A1 * | 10/2003 | Springer | 428/221 |
| 2005/0264028 A1 * | 12/2005 | Bodin et al. | 296/146.6 |

FOREIGN PATENT DOCUMENTS

| | | |
|---|---|---|
| DE | 4342038 A1 | 7/1994 |
| DE | 19802478 A1 | 8/1999 |
| JP | 62134324 A * | 6/1987 |
| JP | 62134327 A * | 6/1987 |
| JP | 04-100730 | 4/1992 |
| JP | 10-37592 A | 2/1998 |
| JP | 2000-145289 | 5/2000 |

* cited by examiner

*Primary Examiner* — Jerry Redman

(74) *Attorney, Agent, or Firm* — Birch, Stewart, Kolasch & Birch, LLP

(57) ABSTRACT

A door structure includes a door for opening and closing a door opening formed in a vehicle body. The door has a side impact bar extending in the backward and forward direction of the vehicle body and a window regulator for lifting and lowering a glass of the door. The window regulator is mounted on the side impact bar and is disposed within a sectional width area of the side impact bar in a vehicle width direction.

5 Claims, 3 Drawing Sheets

VEHICLE WIDTH
DIRECTION

VEHICLE WIDTH DIRECTION

DOOR STRUCTURE

CROSS REFERENCES TO RELATED APPLICATION

This non-provisional application incorporates by reference the subject matter of Application No. 2004-381178 filed in Japan on Dec. 28, 2004, on which a priority claim is based under 35 U.S.C. §119(a).

BACKGROUND OF THE INVENTION

1. Field of the Invention

The present invention relates to a vehicle door structure for opening and closing a door opening formed in a vehicle and, in particular, to a door structure that has a side impact bar.

2. Description of the Related Art

In an inner panel provided in a door of a vehicle for opening and closing a door opening formed in a vehicle, there is formed an opening which is used to mount various kinds of equipment such as a window regulator into inside the door. This opening, after mounting of the equipment, is closed from the inside of a vehicle room with a sheet member such as a vinyl sheet or is closed with a panel member made of resin (which is hereinafter referred to as a resin panel. Inside the door, in order to enhance the safety of the vehicle against collision from a side of the vehicle, there is provided a side impact bar having a square-shaped, U-shaped or round-shaped section, with its two ends respectively fixed to the front and rear ends of the door.

Generally, in order to secure the mounting rigidity of the window regulator, the window regulator is mounted onto the inner panel of the door with its composing parts integrally attached to a bracket made of sheet metal or to a resin panel. JP-A-10-37592 discloses an example of a window regulator formed as a unit product using such sheet-metal-made bracket.

SUMMARY OF THE INVENTION

Although the resin panel is itself light in weight, when the equipment such as a window regulator and a speaker is mounted thereon, the whole of the resin panel becomes heavy in weight due to the weight of the equipment mounted thereon. Therefore, two or more operators are necessary when mounting the resin panel and, with the increased weight, the resin panel is also required of rigidity, resulting in the increased weight of the whole of the resin panel, which can lower the efficiency of the panel mounting operation. Also, recently, there has been raised the need for enhancement in the utility of the inside of the vehicle room.

In view of the above, it is an object of the invention to provide a door structure which, while restricting an increase in weight, can provide high operation efficiency when it is assembled to a vehicle and also can enhance the utility of the inside of the vehicle room.

According to the aspect of the invention, when compared with a structure in which a window regulator is positioned so as to face a side impact bar in the vehicle width direction, there can be provided room in space in the inside of the vehicle door in the vehicle width direction and the thus-increased space in the door in the vehicle width direction can be allocated to the vehicle room. Thus, when forming a pocket in the door on the room inside side thereof, the capacity of the pocket can be increased to thereby enhance the utility of the inside of the vehicle room.

BRIEF DESCRIPTION OF DRAWINGS

The present invention will become more fully understood from the detailed description given hereinbelow and accompanying drawings which are given by way of illustration only, and thus are not limitative of the present invention and wherein.

DETAILED DESCRIPTION OF INVENTION

Figure 1:
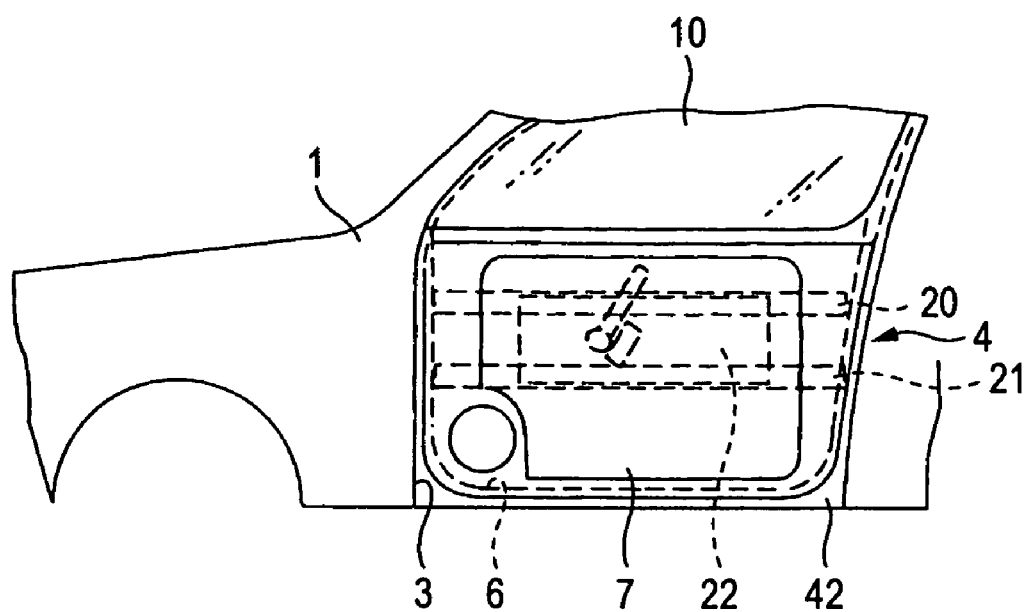
FIG. 1 is a side view of a door for a vehicle incorporating therein a door structure according to an embodiment of the invention.

Now, description will be given below of an embodiment of a door structure according to the invention with reference to the accompanying drawings. In FIG. 1, reference character 1 designates a vehicle body 1 in the interior of which a vehicle compartment is formed. In the side portions and rear portion of the vehicle body 1, there are respectively formed door openings 3 through which an occupant can get into and out of the vehicle compartment or a baggage can be loaded into and unloaded out of the vehicle compartment. On these door openings 3, there are openably and closably mounted doors 4 respectively for opening and closing their corresponding door openings. In the present embodiment, the description will be continued while taking the case of the door opening 3 disposed on the front side of the vehicle body side portion and the door 4 for opening and closing this door opening 3.

Figure 2:
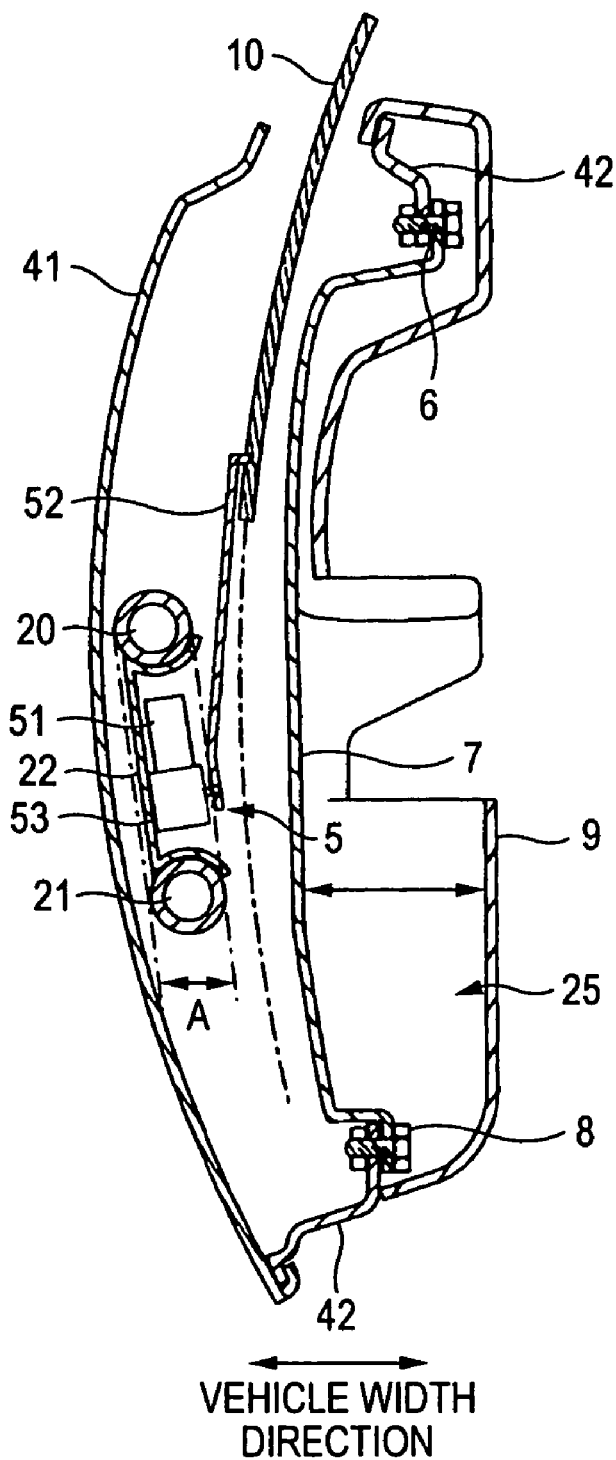
FIG. 2 is an enlarged sectional view of the above door structure.
Figure 3:
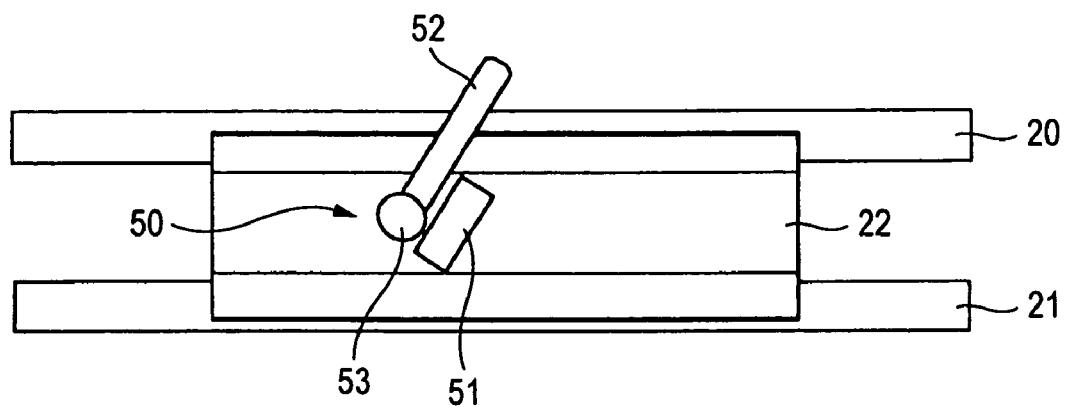
FIG. 3 is an enlarged view of a window regulator mounted on two side impact bars.

The door 4, as shown in FIG. 2, has an outer panel 41 made of metal and an inner panel 42 which are connected to each other to form a bag shape. In the inner panel 42, there is formed an opening 6 for storing a window regulator 5 into the inside of the door. A resin panel 7 for closing the opening 6 is fastened to the inside of the inner panel 42 located on the vehicle room interior side using a fastening member 8 such as a bolt or a screw.

In the inside of the door 4, as shown in FIGS. 1 and 2, there are provided side impact bars 20, 21. The side impact bars 20, 21, as shown in FIG. 1, extend in the backward and forward directions of the vehicle body, while the two ends of the side impact bars are respectively fixed to the front and rear ends of the door 4 whereby the side impact bars 20, 21 are formed integrally with the door 4. In the present embodiment, the side impact bars 20, 21 are made of metal pipes and, when they are viewed from the side of the vehicle body, they are arranged so as to be spaced from each other in the vertical direction. Referring to the shape of the side impact bar, it may not have a cylindrical section but may have a hollow angular section, a U-shaped section or a corrugated section.

The resin panel 7 is formed so as to have a size which is sufficient to cover the opening 6. On the side of the resin panel 7 facing the interior side of the vehicle compartment, there is mounted a door trim 9 which is used to not only conceal the fastening portion (fastening member 8) of the resin panel 7 with the inner panel 42 but also define a storage pocket 25 between the resin panel 7 and the door trim 9. The resin panel 7 is formed such that the near-to-center portion thereof projects more outwardly width direction of the vehicle body than the neighborhood of the portion thereof fixed to the inner panel 42.

The window regulator 5 is used to lift and lower a door glass 10 which can be stored into the inside of the door 4. The window regulator 5 has a drive motor 51, an arm 52 for holding the door glass 10, and a drum 53 for actuating the arm 52. In FIG. 2, a one-dot-chained line shows a track only which the door glass 10 is raised and lowered.

The side impact bars 20, 21 are disposed more outwardly in the width direction of the vehicle body than the track. On the side impact bars 20, 21, there is disposed a bracket 22 made of sheet metal with the two ends thereof respectively welded and fixed to the two side impact bars. In the present embodiment, on the bracket 22, there are mounted the drive motor 51 and the drum 53. The drive motor 51 and the drum 53, as shown in FIG. 2, are respectively arranged in the section width area A of the side impact bars 20, 21 in the width direction of the vehicle body.

According to the structure of the above structured door 4, since the window regulator 5 for lifting and lowering the door glass 10 is mounted on the side impact bars 20, 21 arranged inside the door 4, the rigidity of the side impact bars 20, 21 can be used, which eliminates the need for use of a reinforcing member in mounting the window regulator 5 to thereby reduce the number of parts. This can reduce not only the weight of the vehicle but also the cost thereof.

Since the window regulator 5 is arranged in the section width area A of the side impact bars 20, 21 in the width direction of the vehicle body, when compared with a structure in which the window regulator 5 is arranged so as to face the side impact bars 20, 21 in the width direction of the vehicle body, there can be produced a room in a space in the inside of the door in the width direction of the vehicle body. In other words, when the thus-produced room is allocated to the inside of the vehicle compartment, the capacity of the storage pocket 25 formed on the door and facing the vehicle compartment can be increased, thereby enhancing the utility of the inside of the vehicle compartment.

Because the window regulator 5 is mounted on the two side impact bars 20, 21 through the bracket 22 connected to the two side impact bars 20, 21 so as to straddle them, the bracket 22 is united with the two side impact bars 20, 21 to increase the support rigidity thereof, thereby enhancing the mounting rigidity of the window regulator 5.

Since the near-to-center portion of the resin panel 7 projects more outwardly in the width direction of the vehicle body than the neighborhood of the fixed portion of the resin panel 7 to the inner panel 42, when fixing them together using the fastening member 8, such as a clip or the like, the rigidity of the mounting portions of the resin panel 7 and inner panel 42 can be enhanced. Also, because the projecting portion of the resin panel projecting outwardly in the width direction of the vehicle body produces room in the width direction vehicle body, not only the utility can be enhanced but also the bending rigidity of the resin panel itself can be enhanced. Further, since the window regulator 5 for lifting and lowering the glass 10 of the door 4 is mounted on the side impact bars 20, 21 arranged inside the door 4, the window regulator 5 need not be mounted on the resin panel 7, which eliminates the need to enhance the rigidity of the resin panel 7. This also makes it unnecessary to increase the weight of the resin panel 7, thereby can enhance the efficiency of the door assembling operation.

Figure 4:
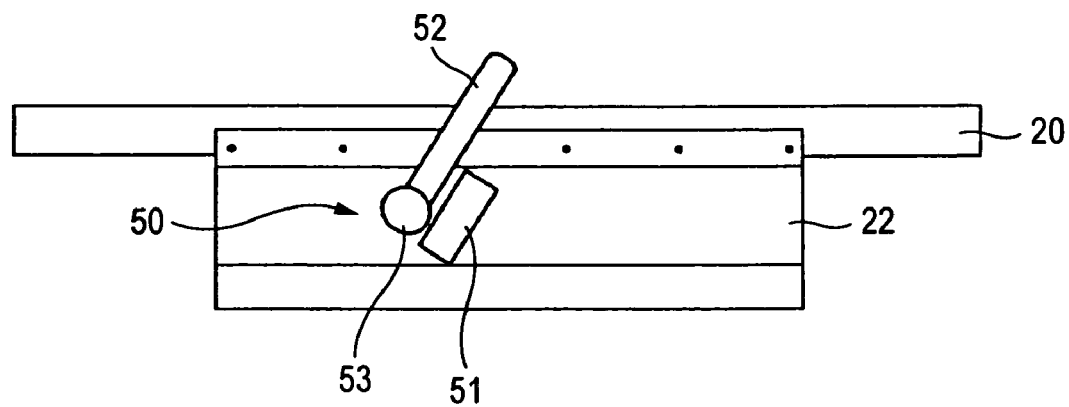
FIG. 4 is an enlarged view a window regulator, showing a state in which it is mounted on a single side impact bar, according to another embodiment of the invention.

Although, in the present embodiment, the drive motor 51 and the drum 52 are mounted on the bracket 22 interposed between the side impact bars 20, 21, the side impact bar structure, as shown in FIG. 4, may also be composed of a single side impact bar 20. In this case, the bracket 22 may be connected, for example, by spot welding to the side impact bar 20 and then the drive motor 51 and drum 52 may be fixed to the bracket 22. Of course, in this case as well, when the drive motor 51 and drum 52 are disposed in the section width area A of the side impact bar 20 in the width direction of the vehicle body, there can be produced a room in a space inside the door in the width direction of the vehicle body. The thus-produced room increases the capacity of the storage pocket 5 formed in the door facing the vehicle compartment, thereby enhancing the utility.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A door structure of a vehicle body, comprising:
    a door for opening and closing a door opening formed in the vehicle body;
    a first side impact bar extending in backward and forward directions of the vehicle body;
    a second side impact bar provided separately from the first side impact bar and extending in the backward and forward directions of the vehicle body, an entire portion of the first side impact bar extending above the second side impact bar, defining a space therebetween;
    a bracket made of a single-piece sheet metal and provided in the space by attaching a first end portion to the first side impact bar and a second end portion, opposite to the first end portion, to the second side impact bar as to straddle the first and second side impact bars, the bracket having a surface that faces an interior of the vehicle body; and
    a window regulator, attached to the surface of the bracket that faces the interior of the vehicle body, for lifting and lowering a door glass along a track comprising a path along which the door glass travels during rising and lowering, the window regulator including a drive motor and a drum for actuating an arm holding the door glass, wherein
    the first and second side impact bars are disposed more outwardly of the vehicle body in the width direction than the track,
    both of the drive motor and the drum are mounted on the bracket in an area defined between the first and second side impact bars in a height direction of the vehicle body, and
    both of the drive motor and the drum are mounted on the bracket within a sectional area of the first and second side impact bars in a width direction of the vehicle body.

2. The door structure according to claim 1,
    wherein the door includes an inner panel, and
    the door structure further comprising:
    a resin panel having a fixing portion fixed to a peripheral edge of an opening formed in the inner panel for closing the opening,
    wherein a portion of the resin panel projects outward in the width direction of the vehicle body than the fixing portion.

3. The door structure according to claim 1,
    wherein the door includes an inner panel, and
    the door structure further comprising:
    a resin panel having a fixing portion fixed to a peripheral edge of an opening formed in the inner panel for closing the opening, wherein a portion of the resin panel projects outward in the width direction of the vehicle body than the fixing portion.

4. The door structure according to claim 3, further comprising:

a door trim attached to the inner panel, wherein a storage pocket is formed in a space between the resin panel and the door trim.

5. A door structure of a vehicle body, comprising:

a door opening formed in the vehicle body;

a door including an inner panel and an outer panel for opening and closing the door opening;

a first side impact bar provided inside the door and extending in backward and forward directions of the vehicle body;

a second side impact bar provided inside the door separately from the first side impact bar and extending in the backward and forward directions of the vehicle body, an entire portion of the first side impact bar extending above the second side impact bar, defining a space therebetween;

a bracket made of a single-piece sheet metal and provided in the space by attaching a first end portion to the first side impact bar and a second end portion, opposite to the first end portion, to the second side impact bar as to straddle the first and second side impact bars, the bracket having a surface that faces an interior of the vehicle body; and a window regulator, attached to the surface of the bracket that faces the interior of the vehicle body, for lifting and lowering a door glass along a track comprising a path along which the door glass travels during rising and lowering, the window regulator including a drive motor and a drum for actuating an arm holding the door glass, wherein the first and second side impact bars are disposed more outwardly of the vehicle body in the width direction than the track, both of the drive motor and the drum are mounted on the bracket in an area defined between the first and second side impact bars in a height direction of the vehicle body, and both of the drive motor and the drum are mounted on the bracket within a sectional area of the first and second side impact bars in a width direction of the vehicle body.

* * * * *